US012669661B2

(12) United States Patent
Wang et al.

(10) Patent No.: US 12,669,661 B2
(45) Date of Patent: Jun. 30, 2026

(54) HYBRID OPTICAL-ELECTRICAL INTERCONNECTION DEVICE

(71) Applicant: MO-LINK TECHNOLOGY LIMITED, Richmond (CA)

(72) Inventors: Hao Wang, Richmond (CA); Haitang Qin, Richmond (CA)

(73) Assignee: MO-LINK TECHNOLOGY LIMITED, Richmond (CA)

( * ) Notice: Subject to any disclaimer, the term of this patent is extended or adjusted under 35 U.S.C. 154(b) by 275 days.

(21) Appl. No.: 18/544,138

(22) Filed: Dec. 18, 2023

(65) Prior Publication Data

US 2024/0219658 A1    Jul. 4, 2024

Related U.S. Application Data

(60) Provisional application No. 63/437,044, filed on Jan. 4, 2023.

(51) Int. Cl.
G02B 6/42            (2006.01)
(52) U.S. Cl.
CPC .......... G02B 6/423 (2013.01); G02B 6/4206 (2013.01); G02B 6/4274 (2013.01)
(58) Field of Classification Search
CPC .............................. G02B 6/423; G02B 6/4293
See application file for complete search history.

(56) References Cited

U.S. PATENT DOCUMENTS

2014/0064667 A1*    3/2014  Isenhour .............. G02B 6/3873
                                                                    385/76

FOREIGN PATENT DOCUMENTS

CN            112034560 A  * 12/2020   ........... G02B 6/3886

OTHER PUBLICATIONS

Translation of CN112034560A (Year: 2020).*

* cited by examiner

*Primary Examiner* — Chad H Smith
(74) *Attorney, Agent, or Firm* — Norton Rose Fulbright Canada LLP

(57)            ABSTRACT

There is provided a hybrid optical-electrical interconnection device. The device may include an enclosure for providing an optical-electrical mating interface. The device may further include a securing device positioned at opposing ends of the mating interface. The device may further include a lens module positioned within the enclosure for providing the mating interface for optical-electrical signals. The lens module may include an aperture set, a lens array adjacent to the aperture set, and one or more fiber alignment cavities having grooves dimensioned to align an end of the respective one or more optical fibres with a corresponding lens of the lens array.

11 Claims, 7 Drawing Sheets

HYBRID OPTICAL-ELECTRICAL INTERCONNECTION DEVICE

CROSS-REFERENCE TO RELATED APPLICATIONS

This claims the benefit of U.S. Provisional Patent Application No. 63/437,044, filed Jan. 4, 2023, the entire contents of which are incorporated herein by reference.

FIELD

Embodiments of the present disclosure generally relate to the field of electronic communications devices, and in particular to hybrid optical-electrical interconnection devices.

BACKGROUND

Interconnection devices can include connectors for interconnecting adjacent transmission cables. In some scenarios, interconnection devices can include connectors for interconnecting a cable and a computing device. For example, interconnection devices can be configured for propagating electrical signals along adjacent and coupled cables, or for propagating electrical signals as between a cable and a computing device. In some other examples, interconnection devices can be configured for propagating optical signals along adjacent and coupled optical fibers, or for propagating optical signals between an optical fiber and a computing device.

SUMMARY

The present disclosure describes embodiments of hybrid optical-electrical interconnection devices. A hybrid optical-electrical interconnection device may be coupled to a transmission cable. In some embodiments, transmission cables may include one or a bundle of electrical wires for propagating electrical signals, or one or a bundle of optical fibers for propagating optical signals.

In some embodiments, adjoining hybrid optical-electrical interconnection devices may be configured to propagate a combination of electrical signals or optical signals from a first transmission cable to an adjacent transmission cable. In some embodiments, a hybrid optical-electrical interconnection device may be configured to interconnect a computing device with a optical-electrical transmission cable for sending or receiving a combination of optical and electrical signals.

In scenarios where interconnection devices are configured for coupling adjacent transmission cables, misalignment of electrical wires or optical fibers along an optical-electrical mating interface may cause attenuation of electrical signals or optical signals being propagated between adjoining transmission cables. The signal attenuation effects may be magnified as signal speeds or bandwidth requirements increase. Further, market trends are requiring that the physical sizes of interconnection devices be reduced. Manufacturing tolerance values for placement of optical fibers or electrical wires relative to optical-electrical mating interfaces may thus be increasing stringent (e.g., on the order of 2 nanometers of placement tolerance, or other stringent tolerance values).

It may be desirable to provide interconnection devices configured to more precisely couple electrical wires or optical fibers to adjoining interconnection devices of downstream electrical wires or optical fibers. Further, it may be desirable to provide interconnection devices for precisely positioning and retaining an optical fiber relative to a lens at the interconnection device.

The present disclosure describes embodiments of hybrid interconnection devices including a combination of optical and electrical connector features for interconnecting adjoining transmission cables or devices.

In an aspect, the present disclosure provides a hybrid optical-electrical interconnection device including elements described and/or illustrated herein.

In another aspect, the present disclosure provides a method for a hybrid optical-electrical interconnection device including operations described and/or illustrated herein.

In another aspect, the present disclosure provides a hybrid optical-electrical interconnection device. The device includes an enclosure for providing an optical-electrical mating interface; a securing device positioned at opposing ends of the mating interface; and a lens module positioned within the enclosure for providing the mating interface for optical-electrical signals, the lens module including: an aperture set receiving one or more electrical contacts for providing an electrical signal interface; a lens array adjacent the aperture set for providing an optical signal interface, the lens array including one or more lenses respectively coupled to one or more optical fibers; and one or more fiber alignment cavities having grooves dimensioned to align an end of the respective one or more optical fibers with a corresponding lens of the lens array.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Electrical transmission cables may be configured for interconnecting computing devices, such as portable computers, tablet devices, smart phone devices, among other examples of computing devices. Electrical transmission cables may be constructed of one or more metal wires for conducting electrical signals or electricity from one device to another device. In some embodiments, electrical transmission cables may include one or more of copper, gold, silver, or aluminum, among other types of metal for conducting electricity or electrical signals.

As data throughput requirements increase, electrical transmission cables may encounter physical limitations associated with speed and bandwidth capabilities. It may be desirable to provide higher speed and bandwidth transmission cables to facilitate data transmission among computing devices.

The present disclosure describes embodiments of hybrid interconnection devices including a combination of optical and electrical connector features for interconnecting adjoining transmission cables or computing devices.

In some embodiments, hybrid interconnection devices may include a plug connector and a socket connector. The socket connector may be configured to interconnect with the corresponding plug connector. In some scenarios, the plug connector may be colloquially known as a "male electrical connector", and the socket connector may be colloquially known as a "female electrical connector".

In scenarios where interconnection devices are configured for coupling adjacent transmission cables, misalignment of electrical wires or optical fibers along an optical-electrical mating interface may cause attenuation of electrical signals or optical signals being propagated between adjoining transmission cables. The signal attenuation effects may be magnified as signal speeds or bandwidth requirements increase. Further, market trends are requiring that the physical sizes of interconnection devices be reduced. Manufacturing tolerance values for placement of optical fibers or electrical wires relative to optical-electrical mating interfaces may thus be increasing stringent (e.g., on the order of 2 nanometers of placement tolerance).

It may be desirable to provide interconnection devices for precisely coupling electrical wires or optical fibers to adjoining interconnection devices coupled to downstream electrical wires or optical fibers. Further, it may be desirable to provide interconnection devices for precisely positioning and retaining an optical fiber relative to a lens at the interconnection device.

Figure 1:
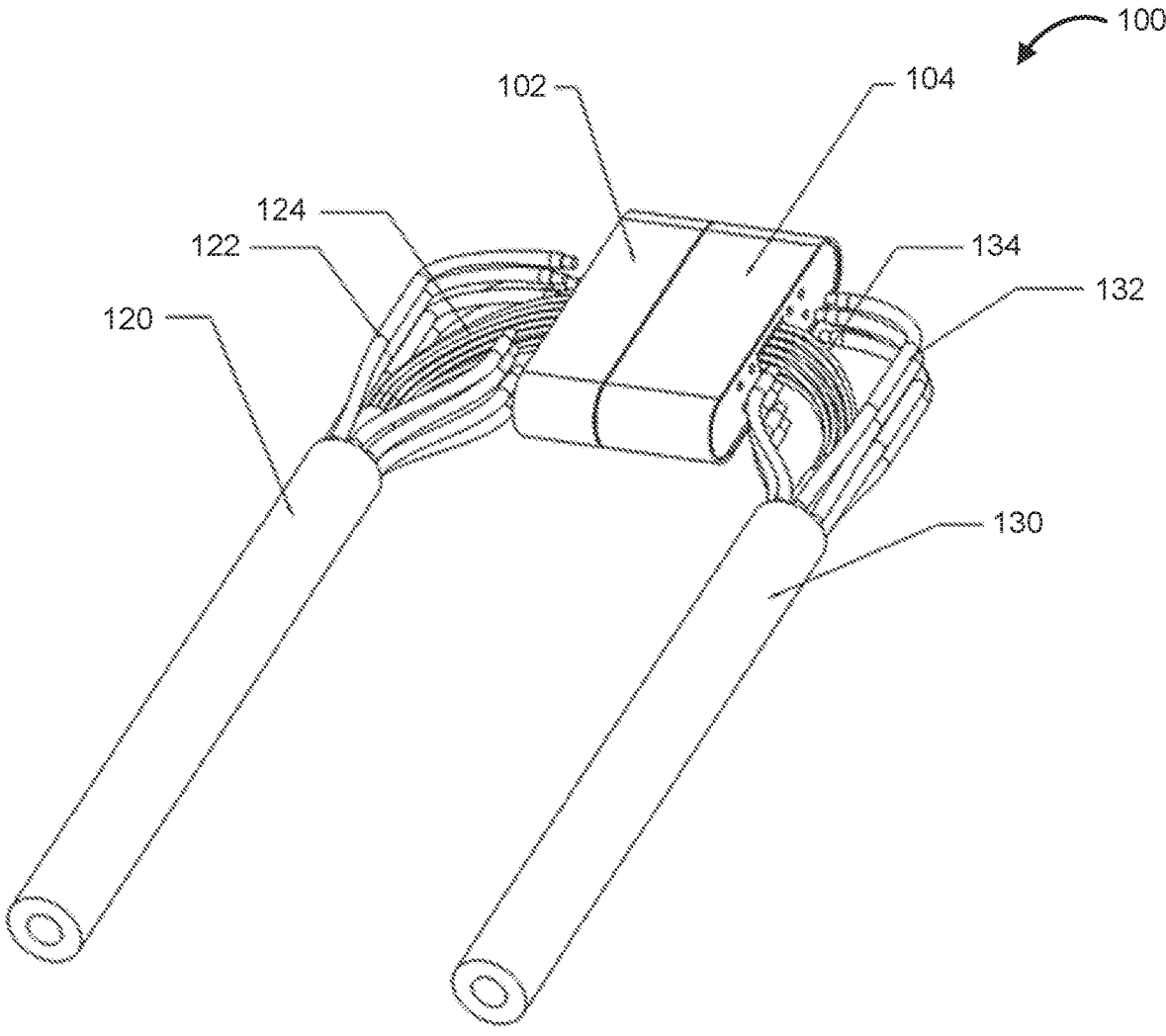
FIG. 1 illustrates a perspective view of a hybrid optical-electrical interconnection system, in accordance with an embodiment of the present disclosure.

Reference is made to FIG. 1, which illustrates a perspective view of a hybrid optical-electrical interconnection system 100, in accordance with embodiments of the present disclosure. The hybrid interconnection system 100 includes a plug connector 102 and a socket connector 104. As will be described herein, in some embodiments, the plug connector 102 and socket connector 104 may be respectively coupled to a hybrid cable 120, 130.

To illustrate, the plug connector 102 may be coupled to a first hybrid cable 120. The first hybrid cable 130 may be a bundle of transmission cables including one or more electrical wires 122 and one or more optical fibers 124. The socket connector 104 may be coupled to a second hybrid cable 130. The second hybrid cable 130 may be a bundle of transmission cables including one or more electrical wires 132 and one or more optical fibers 134.

In some scenarios, a combined set of electrical and optical signals may be transmitted from the first hybrid cable 120 to the second hybrid cable 130, and vice versa, via engagement of the plug connector 102 and the socket connector 104.

Figure 2:
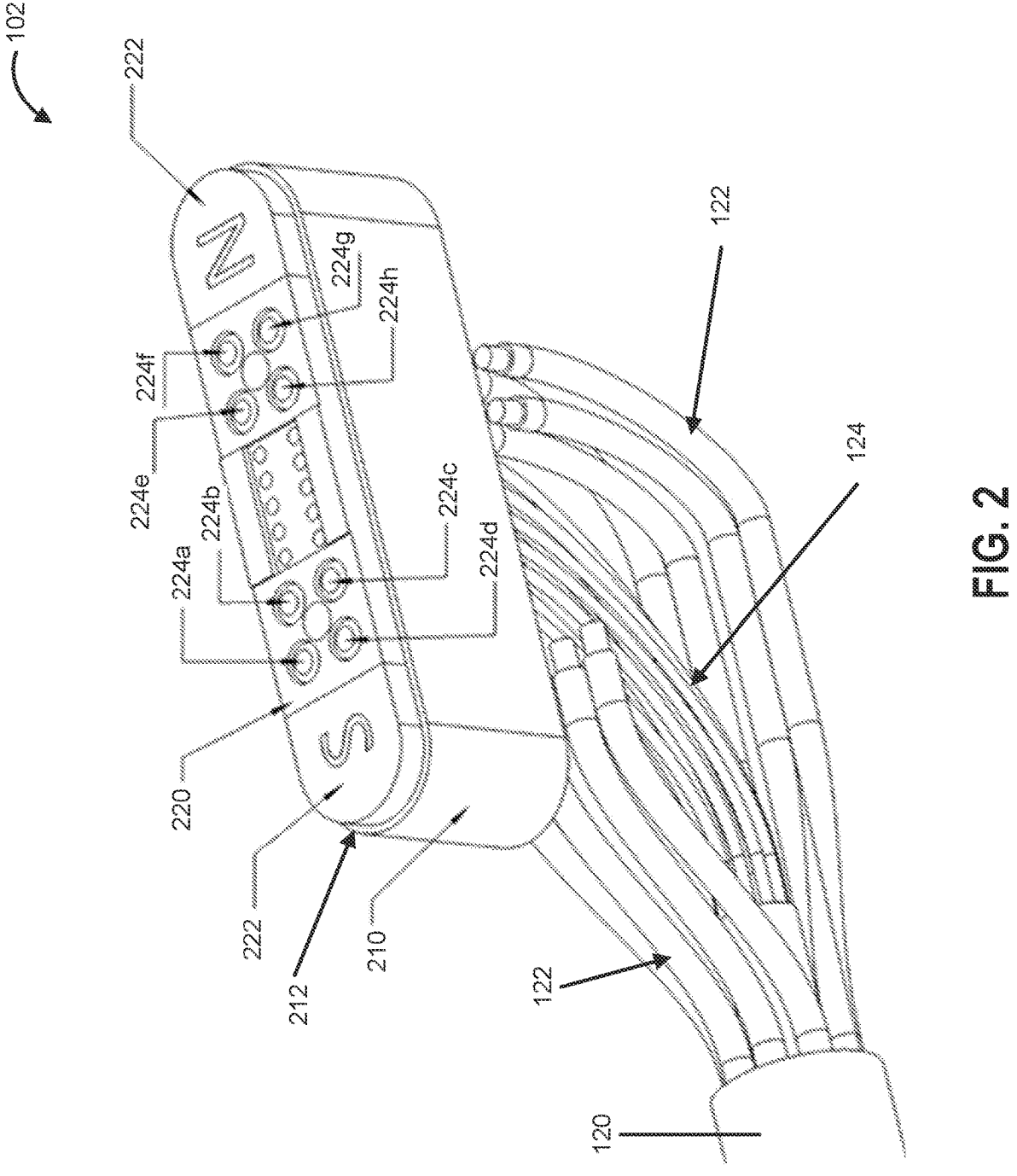
FIG. 2 illustrates an enlarged perspective view of a plug connector, in accordance with embodiments of the present disclosure.

Reference is made to FIG. 2, which illustrates an enlarged perspective view of the plug connector 102, in accordance with embodiments of the present disclosure. The plug connector 102 includes an enclosure 210. The enclosure device may be configured to provide structure for encapsulating features of the plug connector 102.

Features of the plug connector 102 may be configured to provide transmission of a combination of electrical signals and optical signals to and from the plug connector 102. In some embodiments, the enclosure 210 may be constructed based on injection molding operations, and may have a manufacturing dimensional tolerance in the range of nanometers values.

The plug connector 102 may include a lens module 220, one or more securing devices 222, or one or more pins 224*a* to 224*h*.

In some embodiments, the plug connector 102 may include a perimeter having a recessed lip 212 relative to the securing device 222 or the lens module 220.

In some embodiments, the one or more securing devices 222 may include one or more magnets on opposing sides of the enclosure 210. In the illustration of FIG. 2, the magnets on opposing sides of the enclosure 210 may have opposite polarity. When the plug connector 102 and the socket connector 104 are brought into relatively close proximity, magnetic attraction with opposing magnets on the socket connector 104 may cause the plug connector 102 and the socket connector 104 to be brought into physical engagement.

In FIG. 2, the securing devices 222 are illustrated on opposing sides of the enclosure 210 and have opposite polarity (e.g., north magnetic polarity and south magnetic polarity). In some other embodiments, the pair of securing devices 222 of the plug connector 102 may have the same polarity, and a pair of securing devices of the socket connector 104 may have a polarity opposite to that of the securing devices 222 of the plug connector 102.

In some embodiments, the securing devices 222 may have a geometric profile that corresponds to portions of a footprint of the plug connector 102. For example, the securing device 222 may have a semi-circle profile, as illustrated in FIG. 2. Other geometric profiles for the securing devices 222 may be used. In some embodiments, a pair of securing devices 222 may be positioned on opposing sides of the lens module 220. In some embodiments, the combination of the securing devices 222 and the lens module 220 may be contained within the enclosure 210.

In some embodiments, one or more of the pins 224*a* to 224*h* may be spring-loaded pins for electrically connecting with a corresponding plurality of pins of the socket connector 104. In some other embodiments, the plurality of pins 224*a* to 224*h* may be statically positioned pins (e.g., non-spring loaded).

The plurality of pins 224*a* to 224*h* may be coupled to respective electrical wires 122. When the plug connector 102 is brought into engagement with the socket connector 104, the plurality of pins 224*a* to 224*h* may be electrically coupled to corresponding electrical pins of the socket connector 104. In FIG. 2, although eight pins 224*a* to 224*h* are illustrated for providing electrical connections, a greater or lesser number of pins for providing electrical connections across the hybrid interconnection system may be used.

Figure 3:
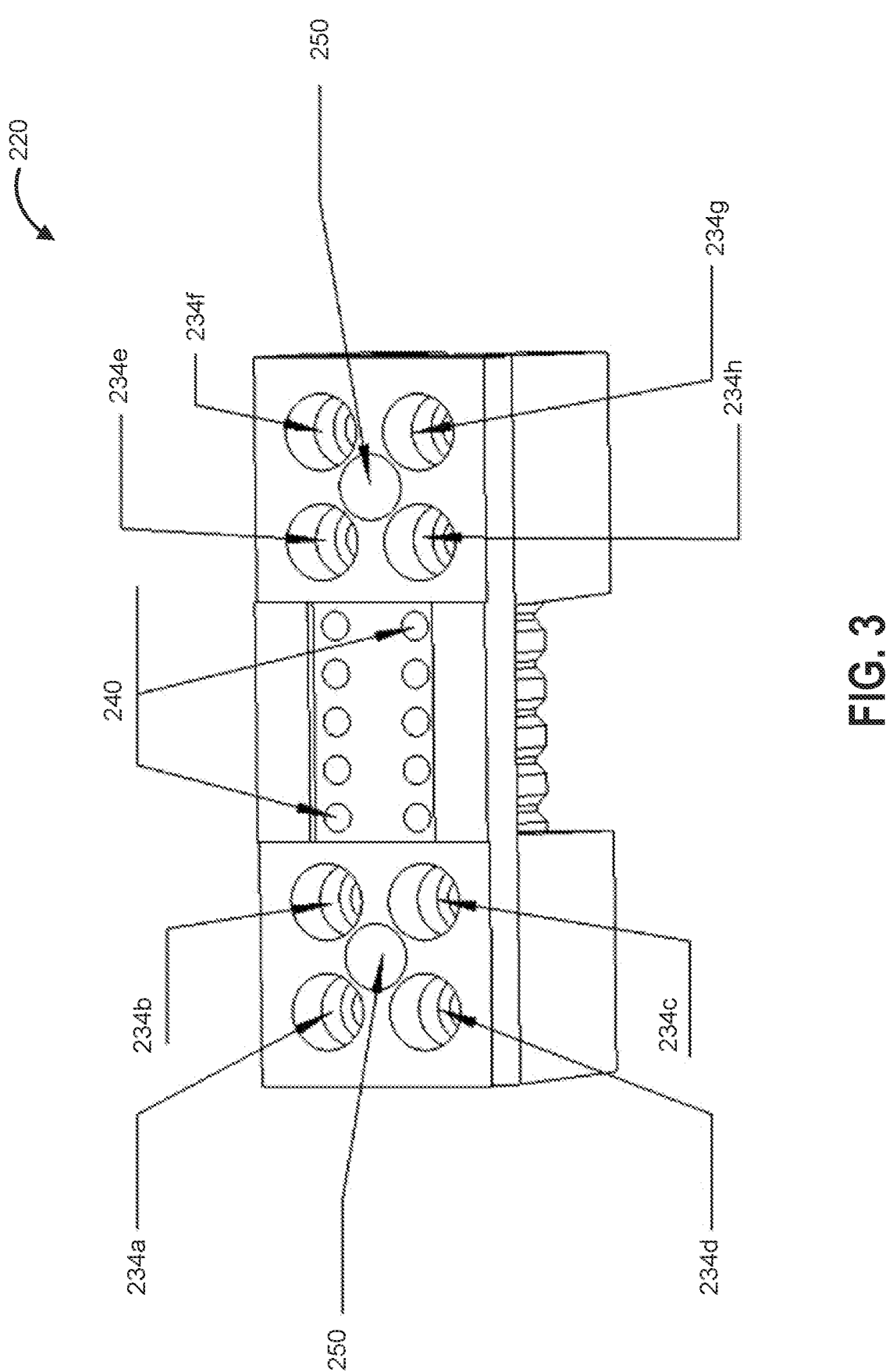
FIG. 3 illustrates a front perspective view of a lens module, in accordance with embodiments of the present disclosure.

Reference is made to FIG. 3, which illustrates a front perspective view of the lens module 220, in accordance with embodiments of the present disclosure. The lens module 220 includes a lens array 240 configured to position one or a plurality of lenses for coupling with optical fibers 124 (not explicitly illustrated in FIG. 3).

The lens module 220 may include a series of pin through-holes 234a to 234h for receiving the plurality of pins 224a to 224h (FIG. 2). The series of pin through-holes 234a to 234h may be apertures and may be configured as a conduit for positioning the corresponding plurality of pins 224a to 224h to provide electrical connections from the plug connector 102 to an adjoining socket connector 104 (not illustrated in FIG. 3).

The lens module 220 may include one or more alignment features 250 to correspond to opposing alignment features of the socket connector 104. In some embodiments, the one or more alignment features 250 may be proximal to a centroid position relative to a first group of pin through-holes 234a to 234d or a second group of pin through-holes 234e to 234h. In some embodiments, the one or more alignment features 250 may be protrusion features configured to be received within corresponding recessed features of an engaged socket connector 104 (not shown in FIG. 3). The alignment features 250 may be configured to align corresponding pins for providing electrical connections across the combination of the plug connector 102 and socket connector 104. Similarly, the alignment features 250 may be configured for aligning corresponding lenses across the plug connector 102 and socket connector 104 for providing optical interconnections.

The respective lenses of the lens array 240 may correspond to an optical fiber 124 of the bundle of transmission cables. In some scenarios, it may be desirable to transmit optical signals across an engaged plug connector 102 and socket connector 104 with low optical energy density. Accordingly, in some embodiments, the respective lenses may include at least one collimating lens. When the lens module 220 includes one or more collimating lens, the lens module 220 may receive divergent light from an input optical signal and provide aligning optical signals (akin to parallel light signals) for transmission across an engaged plug connector 102 and socket connector 104.

In a scenario where optical signals are being transmitted in a direction from the plug connector 102 to the socket connector 104, in some embodiments, a corresponding lens module of the socket connector 104 may include at least one focusing lens configured to couple received optical signals to the one or more optical fibers 134 associated with the socket connector 104 (FIG. 1).

The above-described features of embodiments of the lens module 220 for transmitting optical signals across engaged connector components with low optical energy density may be useful for facilitating production line testing of manufactured connectors and corresponding cables.

As described, the respective lenses of the lens array 240 may be coupled to an optical fiber 124 of the bundle of transmission cables. In some scenarios, a required tolerance governing eccentricity or placement of the optical fiber 124 relative to a lens of the lens array 240 may be on the order of micrometers (e.g., less than 2 $\mu$m, or other stringent placement tolerance requirement). It may be desirable to provide connector features for precisely positioning respective optical fibers 124 relative to a corresponding lens of the lens array 240 for increasing connector/cable production yields and for reducing failure rates of the manufactured connector cable.

Figure 4:
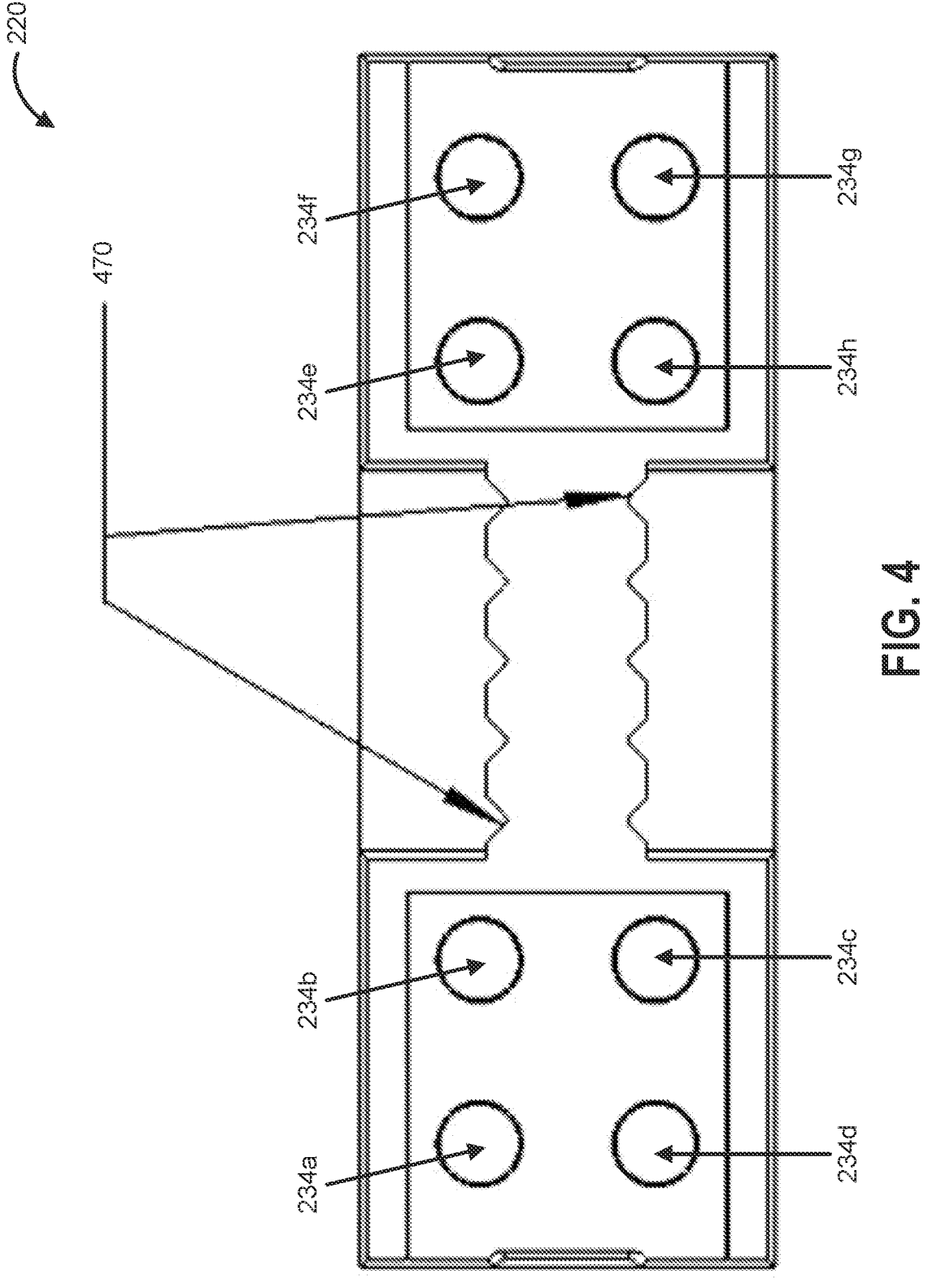
FIG. 4 illustrates a cut-away plan view of the lens module of FIG. 3.

Reference is made to FIG. 4, which illustrates a cut-away plan view of the lens module 220 of FIG. 3. The lens module 220 includes the series of pin through-holes 234a to 234h for receiving the plurality of pins 224a to 224h (FIG. 2). Electrical cables may be coupled to respective pins 224a to 224h, and the pins 224a to 224h may be received through the series of pin through-holes 234a to 234h. When the plug connector 102 and the socket connector 104 are engaged, the pins 224a to 224h may be coupled to corresponding pins of the socket connector 104 for interconnecting one or more electrical wires 122 with corresponding one or more electrical wires 132 (FIG. 1).

In some scenarios, it may be desirable to reduce physical dimensions of connector enclosures 210 (FIG. 2). Reducing the enclosure sizes may lead to connector components being positioned relatively nearer to other components within a smaller connector footprint. Accordingly, the required manufacturing tolerance associated with placement of components within the connector enclosure 210 may be increasingly stringent. For example, the required tolerance governing placement of optical fibers 124 relative to a lens of the lens array 240 may be less than 2 $\mu$m. Accordingly, the lens module 220 may include one or more fiber alignment cavities 470 for receiving an optical fiber 124.

In some embodiments, the one or more fiber alignment cavities 470 (FIG. 4) may be constructed as a series of valleys respectively corresponding to a lens of a lens array 240 (FIG. 3). When an optical fiber 124 is positioned within a fiber alignment cavity 470, an end of the optical fiber 124 is configured to be aligned with a corresponding lens. Thus, the one or more fiber alignment cavities 470 may be configured to provide alignment of ends of optical fibers 124 with corresponding lenses of the lens array 240 to within a 2 $\mu$m tolerance specification. In some embodiments, the one or more fiber alignment cavities may be configured according to other tolerance specification values. In some embodiments, the fiber alignment cavity 470 may have at least one of a triangular or a saw-tooth profile. Other geometric profiles for the fiber alignment cavity 470 may be used.

Figure 5:
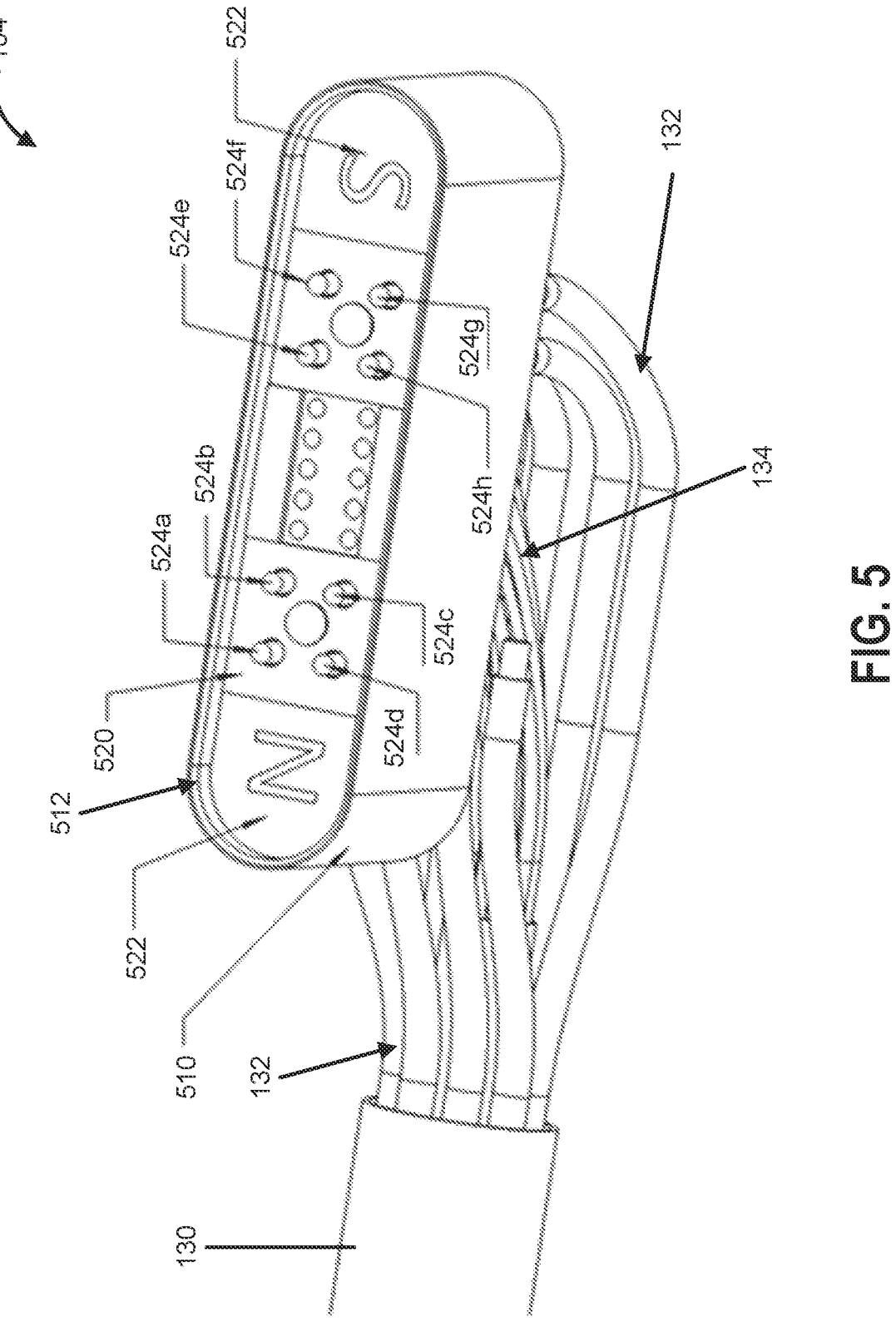
FIG. 5 illustrates an enlarged perspective view of a socket connector, in accordance with embodiments of the present disclosure.

Reference is made to FIG. 5, which illustrates an enlarged perspective view of the socket connector 104, in accordance with embodiments of the present disclosure. The socket connector may include a socket enclosure 510 for encapsulating features of the socket connector 104. In some embodiments, the socket connector 104 may have similar features or features that may be complementary to the plug connector 102. In some embodiments, the socket enclosure 510 may be constructed based on injection molding operations, and having a manufacturing dimensional tolerance in the range of nanometers.

In some embodiments, the socket connector 104 may include a perimeter having a raised lip 512. The raised lip 512 may be configured to receive the plug connector 102 when the plug connector 102 is engaged with the socket connector 104.

The socket connector 104 may include a lens module 520, one or more securing devices 522, or one or more pins 524a to 524h.

Similar to the securing devices 222 described with reference to FIG. 2, the one or more securing devices 522 may include one or more magnets on opposing sides of the enclosure 510. The magnets on opposing sides of the enclosure 510 may have opposite polarity, such that when the socket connector 104 is positioned in relatively close proximity with the plug connector 102, magnetic attraction with opposing magnets on the plug connector 102 may cause the pair of connectors to be in physical engagement. In the present example, because opposite polarities are on opposing sides of the socket connector 104, engagement of the plug connector 102 and the socket connector 104 may be directionally dependent. That is, a 'north polarity' side of the socket connector 104 may be configured to engage with a 'south polarity' side of the plug connector 102. Similarly, a 'south polarity' side of the socket connector 104 may be configured to engage with a 'north polarity' side of the plug connector 102.

In some other embodiments, the pair of securing devices 522 of the socket connector 104 may have the same polarity, and the pair of securing devices 522 of the socket connector 104 may have a polarity opposite to that of the securing devices 222 of the plug connector 102. In the present example, the plug connector 102 may be engaged with the socket connector 104 in any of two orientations.

Similar to the plug connector 102, the securing devices 522 of the socket connector 104 may have a geometric profile that corresponds to portions of a footprint of the socket connector 104. For example, the securing devices 522 may have a semi-circle profile, as illustrated in FIG. 5. Other geometric profiles for the securing devices 522 may be used. In some embodiments, the combination of the securing devices 522 may be positioned on opposing sides of the lens module 520. The combination of the securing devices 522 and the lens module 520 may be contained within the enclosure 510.

In some embodiments, one or more of the pins 524a to 524h may be spring-loaded pins for electrically contacting corresponding pins of the plug connector 102. In some other embodiments, the plurality of pins 524a to 524h may be statically positioned pins (e.g., non-spring loaded).

One or more of the pins 524a to 524h may be coupled to respective electrical wires 132. When the socket connector 104 is brought into engagement with the plug connector 102, the plurality of pins 524a to 524h may be electrically coupled to corresponding electrical pins of the plug connector 102. In FIG. 5, although eight pins are illustrated, a greater or lesser number of pins for providing electrical connections across the hybrid interconnection system may be used.

Figure 6:
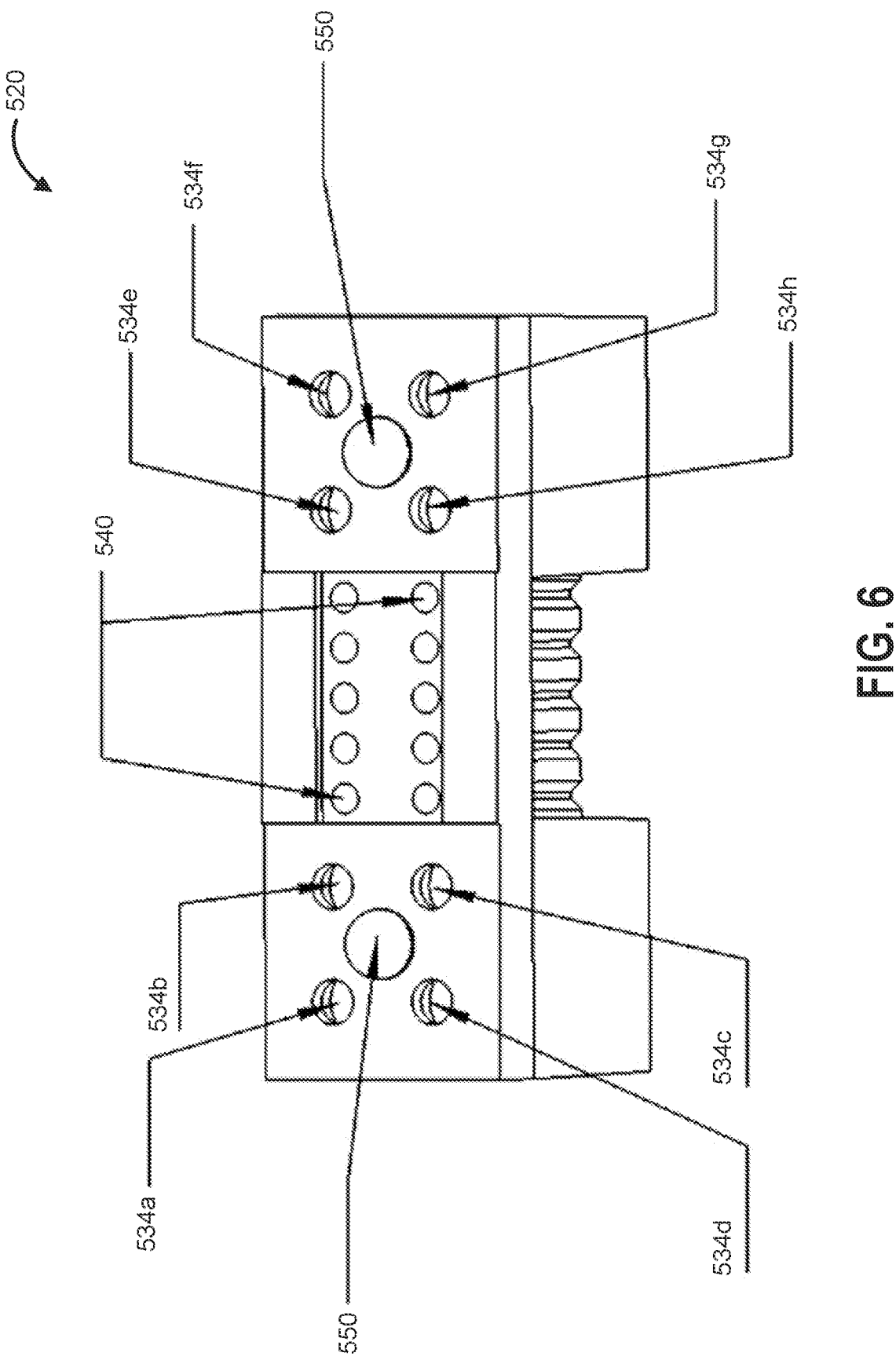
FIG. 6 illustrates a front perspective view of a lens module, in accordance with another embodiment of the present disclosure.

Reference is made to FIG. 6, which illustrates a front perspective view of the lens module 520, in accordance with embodiments of the present disclosure. The lens module 520 includes a lens array 540 configured to position one or a plurality of lenses for coupling with optical fibers 134 (not explicitly illustrated in FIG. 6).

The lens module 520 may have features similar to or corresponding to the lens module 220 described with reference to FIG. 3. The lens module 520 may include a series of pin through-holes 534a to 534h for receiving the plurality of pins 524a to 524h (FIG. 5). The series of pin through-holes 534a to 534h may be configured as a conduit for positioning the corresponding plurality of pins 524a to 524h for providing electrical connections from the socket connector 104 to an adjoining plug connector 102 (not illustrated in FIG. 6).

The lens module 520 may include one or more alignment features 550 to correspond to opposing alignment features 250 of the plug connector 102. In some embodiments, the alignment features 550 of the lens module 520 may be recessed features for receiving protrusion features of the corresponding plug connector 102. The alignment features 550 may be configured to align corresponding pins for providing electrical connections across the combination of the socket connector 104 and the plug connector 102. Similarly, the alignment features 550 may be configured for aligning corresponding lenses across the socket connector 104 and the plug connector 102 for providing optical interconnections.

As described with reference to FIG. 3, in some scenarios, it may be desirable to transmit optical signals across engaged plug connector 102 and socket connector 104 with low optical energy density. To complement features of the lens array 240 described with reference to FIG. 3, the lens array 540 of the socket connector 104 may include one or more focusing lenses. When the lens module 520 includes the focusing lenses, the lens module 520 may receive aligning optical signals (e.g., parallel light signals) and provide focused light signals for downstream transmission along corresponding optic fibers 132 coupled to the socket connector 104.

In other scenarios where optical signals may be transmitted from the socket connector 104 across to the plug connector 102, the socket connector 104 may include one or more collimating lenses and the plug connector 102 may include the one or more focusing lenses.

In some embodiments, the plug connector 102 or the socket connector 104 may respectively include a combination of both collimating and focusing lenses to allow for bi-directional optical signal transmission cross the optical-electrical mating interfaces.

Figure 7:
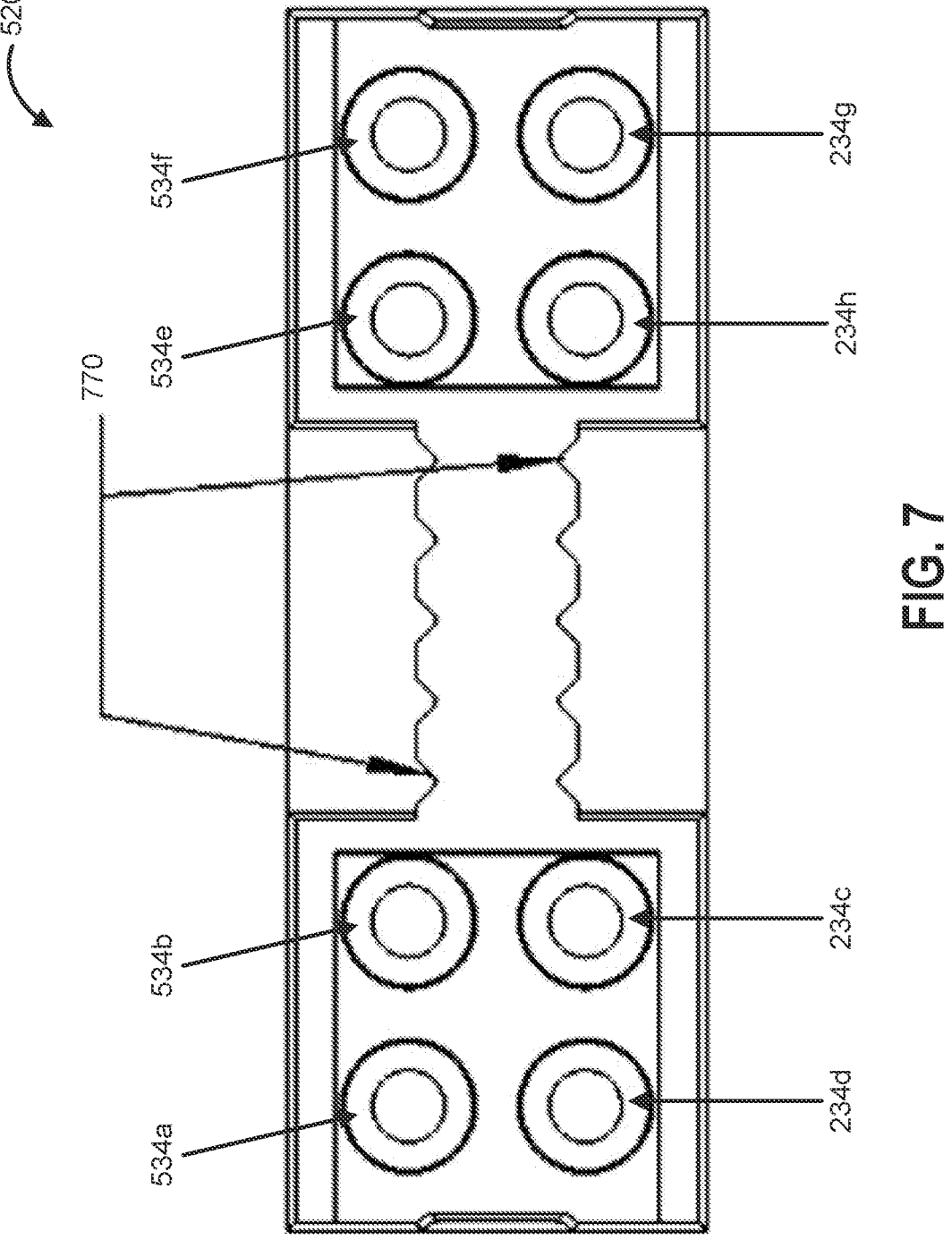
FIG. 7 illustrates a cut-away plan view of the lens module of FIG. 6.

Reference is made to FIG. 7, which illustrates a cut-away plan view of the lens module 520 of FIG. 6. The lens module 520 includes the series of pin through-holes 534a to 534h for receiving the plurality of pins 524a to 524h (FIG. 5). Electrical cables may be coupled to respective pins 524a to 524h and the pins 524a to 524h may be received through the series of pin through-holes 534a to 534h. When the socket connector 104 and the plug connector 102 are engaged, the pins of the corresponding connectors may be coupled for interconnecting one or more electrical wires 122 of the plug connector 102 and the one or more electrical wires 132 of the socket connector 104.

In some embodiments, some features of the lens module 520 may be similar to the lens module 220 described with reference to FIG. 2. For example, it may be desirable to reduce physical dimensions of connector enclosures 510 (FIG. 5). Reducing the enclosure sizes may lead to connector components being positioned relatively nearer to other components within the smaller connector footprint. Accordingly, the required manufacturing tolerance associated with component placement within the connector enclosure 510 may be increasingly stringent. Thus, in some embodiments, the lens module 520 may include one or more fiber alignment cavities 770 for respectively receiving an optical fiber 134.

In some embodiments, the one or more fiber alignment cavities 770 (FIG. 7) may be constructed as a series of valleys respectively corresponding to a lens of a lens array 540 (FIG. 6). When an optical fiber 134 is positioned within a fiber alignment cavity 770, an end of the optical fiber 145 is configured to be aligned with a corresponding lens. Thus, the one or more fiber alignment cavities 770 may be configured to provide alignment of ends of optical fibers 134 with corresponding lenses of the lens array 540 within a 2 μm tolerance specification. In some embodiments, the one or more fiber alignment cavities may be configured according to other tolerance specification values.

Based on embodiments of features the plug connector 102 and the socket connector 104 described in the present disclosure, when the plug connector 102 and the socket connector 103 are positioned in proximal physical location of one another, the connectors will engage based on magnetic fields of attraction.

Upon the plug connector 102 engaging with the socket connector 104, the one or more pins 224a to 224h of the plug connector 102 may contact corresponding pins 524a to 524h of the socket connector 104, such that electrical signals can be conveyed between electrical wires 122, 132 on corresponding sides of the engaged plug connector 102 and socket connector 104. In some scenarios, the electrical interconnection based on engagement of the plug connector 102 and the socket connector 104 may be uni-directional or bi-directional.

Similarly, upon the plug connector 102 engaging the socket connector 104, alignment features 250 of the plug connector 102 may engage with the alignment features 550 of the socket connector 102, thereby providing alignment of the respective lens arrays 240, 540 for providing optical interconnections. Optical signals may be conveyed between optical fibers 122, 132 on corresponding sides of the engaged plug connector 102 and socket connector 104. In some scenarios, the optical interconnection based on engagement of the plug connector 102 and the socket connector 104 may be uni-directional. In some other embodiments, features of the respective lens arrays 240, 540 may be configured to provide bi-directional optical interconnections.

In some of the embodiments described herein, one or a combination of features may provide for increased positioning and alignment of electrical wire or optical fiber at an optical-electrical mating interface of interconnection devices. For example, one or a combination of (1) securing devices 222, 522; (2) alignment features 250, 550; or (3) fiber alignment cavities 470, 770 for more precisely aligning optical or electrical signal transmission components across the optical-electrical mating interfaces of engaged interconnection devices.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

As can be understood, the examples described above and illustrated are intended to be exemplary only.

What is claimed is:

1. A hybrid optical-electrical interconnection device, comprising:
   an enclosure for providing an optical-electrical mating interface;
   a securing device positioned at opposing ends of the mating interface; and
   a lens module positioned within the enclosure for providing the mating interface for optical-electrical signals, the lens module including:
      an aperture set receiving one or more electrical contacts for providing an electrical signal interface;
      a lens array adjacent the aperture set for providing an optical signal interface, the lens array including one or more lenses respectively coupled to one or more optical fibers; and
      one or more fiber alignment cavities having grooves dimensioned to align an end of the respective one or more optical fibers with a corresponding lens of the lens array.

2. The hybrid optical-electrical interconnection device of claim 1, wherein the one or more fiber alignment cavities having at least one of a triangular or a saw-tooth profile for retaining the respective one or more optical fibers with a corresponding lens to within a tolerance value of a concentric placement.

3. The hybrid optical-electrical interconnection device of claim 1, wherein the securing device includes two or more magnet devices positioned at opposing ends of the mating interface,
   wherein the two or more magnet devices configured to interact with magnet devices of an adjacent hybrid optical-electrical interconnection device to provide a securing force coupling respective optical-electrical mating interfaces.

4. The hybrid optical-electrical interconnection device of claim 1, wherein the lens module includes an alignment feature to interact with a corresponding alignment feature of an adjacent hybrid optical-electrical interconnection device, the alignment feature including pin-shaped member protruding from the lens module, and the corresponding alignment feature including a recessed notch for receiving the opposing pin-shaped member.

5. The hybrid optical-electrical interconnection device of claim 1, wherein the lens array includes at least one collimating lens to provide aligning optical signal for transmission to an adjacent hybrid optical-electrical interconnection device.

6. The hybrid optical-electrical interconnection device of claim 1, wherein the one or more electrical contacts include spring-loaded electrical contacts coupled to electrical wires.

7. The hybrid optical-electrical interconnection device of claim 1, wherein the hybrid optical-electrical interconnection device is a socket connector, wherein the enclosure includes a perimeter having a raised lip at the optical-electrical mating interface relative to the securing device and the lens module.

8. The hybrid optical-electrical interconnection device of claim 1, wherein the hybrid optical-electrical interconnection device is a plug connector, wherein the enclosure includes a perimeter having a recessed lip at the optical-electrical mating interface relative to the securing device and the lens module.

9. The hybrid optical-electrical interconnection device of claim 1, wherein the securing device includes two or more magnet devices positioned at opposing ends of the mating interface, wherein said two or more magnet devices have a same polarity.

10. The hybrid optical-electrical interconnection device of claim 1, wherein the securing device includes two or more magnet devices positioned at opposing ends of the mating interface, wherein said two or more magnet devices have opposite polarities.

11. The hybrid optical-electrical interconnection device of claim 1, wherein said one or more grooves extend for a groove distance from a mating interface end to a back end of said lens module, and wherein said one or more lenses are shorter than said groove distance.

\* \* \* \* \*